US00RE44622E

(19) United States
(12) Reissued Patent
Fu et al.

(10) Patent Number: US RE44,622 E
(45) Date of Reissued Patent: Dec. 3, 2013

(54) COARSE CARRIER FREQUENCY OFFSET ESTIMATION FOR A RECEIVER

(71) Applicants: Xiaoyu Fu, Chengdu (CN); Jun Ma, Shanghai (CN); Nabil Yousef, Foothill Ranch, CA (US)

(72) Inventors: Xiaoyu Fu, Chengdu (CN); Jun Ma, Shanghai (CN); Nabil Yousef, Foothill Ranch, CA (US)

(73) Assignee: Newport Media, Inc., Lake Forest, CA (US)

(21) Appl. No.: 13/645,489

(22) Filed: Oct. 4, 2012

Related U.S. Patent Documents

Reissue of:

(64) Patent No.: 7,944,983
Issued: May 17, 2011
Appl. No.: 12/039,799
Filed: Feb. 29, 2008

(51) Int. Cl.
*H04K 1/10* (2006.01)

(52) U.S. Cl.
USPC ..... 375/260; 375/259; 375/343; 375/149; 375/341; 370/206; 370/208; 370/210

(58) Field of Classification Search
USPC ..... 375/260, 259, 343, 149, 341; 370/206, 370/208, 210
See application file for complete search history.

(56) References Cited

U.S. PATENT DOCUMENTS

2004/0179625 A1* 9/2004 Kim ..... 375/260
2008/0186948 A1* 8/2008 Ramaswamy et al. ..... 370/350

* cited by examiner

*Primary Examiner* — Zewdu Kassa
(74) *Attorney, Agent, or Firm* — Rahman LLC

(57) ABSTRACT

A method of estimating coarse frequency offset of received symbols based on a received frequency domain sample at a $k^{th}$ sub-carrier of a $53^{rd}$ Orthogonal Frequency Division Multiplexing (OFDM) data symbol in a $j^{th}$ time slot (TS) of a receiver in a [China Multimedia Mobile Broadcasting (CMMB) mobile television] *communication* network includes dividing a received sample, $Y_k^j$, into two sets of noise only tones and data plus noise tones $D_k^j$, obtaining a received sample only if there is a coarse frequency offset mismatch between a transmitter and the receiver, dividing a summation of a power of the data plus noise tones by a summation of a power of the noise only tones to obtain $\Lambda_k^j$, and estimating an integer coarse frequency offset estimate, $\Delta\hat{f}_I^j$, of the received symbols when the $\Lambda_k^j$ is a maximum.

22 Claims, 9 Drawing Sheets

COARSE CARRIER FREQUENCY OFFSET ESTIMATION FOR A RECEIVER

Matter enclosed in heavy brackets [ ] appears in the original patent but forms no part of this reissue specification; matter printed in italics indicates the additions made by reissue.

*CROSS REFERENCE TO RELATED APPLICATION*

*This application is a reissue of U.S. Pat. No. 7,944,983, issued on May 17, 2011, the contents of which in its entirety, is herein incorporated by reference.*

BACKGROUND

1. Technical Field

The embodiments herein generally relate to China Multimedia Mobile Broadcasting (CMMB), and, more particularly, to coarse carrier frequency offset estimation for CMMB mobile television (TV) receivers.

2. Description of the Related Art

CMMB is a mobile television and multimedia standard based on the satellite and terrestrial interactive multiservice infrastructure (STiMi). It specifies usage of the 2.6 GHz frequency band and occupies 25 MHz bandwidth within which it provides 25 video and 30 radio channels with additional data channels. Orthogonal Frequency Division Multiplexing (OFDM) is a digital multi-carrier modulation scheme, which uses a large number of closely-spaced orthogonal sub-carriers. Each sub-carrier is modulated with a conventional modulation scheme (e.g., quadrature amplitude modulation) at a low symbol rate, maintaining data rates similar to conventional single-carrier modulation schemes in the same bandwidth. Because of its multiple advantages (e.g., high spectrum efficiency, resistance against multi-path interference, and ease of filtering out noise etc.), OFDM has been widely used in wireless transmission technology.

However OFDM requires very accurate frequency synchronization between the receiver and the transmitter; with frequency deviation, the sub-carriers are no longer orthogonal, causing inter-carrier interference (ICI) or cross-talk between the sub-carriers. Frequency offsets are typically caused by mismatched transmitter and receiver oscillators, or by Doppler shift due to movement. While Doppler shift alone may be compensated for by the receiver, the situation is worsened when combined with multipath factors, as reflections will appear at various frequency offsets, which is much harder to correct. This effect typically worsens as speed increases, and is an important factor limiting the use of OFDM in high-speed vehicles. Several techniques for ICI suppression are suggested, but they may increase the receiver complexity. CMMB uses the OFDM technique to achieve low cost equalizer implementation, large frequency diversity gain, and high spectrum efficiency.

SUMMARY

In view of the foregoing, an embodiment herein provides a method of estimating coarse frequency offset based on a received frequency domain sample at a $k^{th}$ sub-carrier of a $53^{rd}$ OFDM data symbol in a $j^{th}$ time slot (TS) of a receiver in a CMMB mobile television network and includes dividing a received sample, $Y_k^j$ into two sets of noise only tones and data plus noise tones $D_k^j$, obtaining a received sample only if there is a coarse frequency offset mismatch between a transmitter and the receiver, dividing a summation of a power of the data plus noise tones by a summation of a power of the noise only tones to obtain $A_k^j$, and estimating an integer coarse frequency offset estimate $\Delta\hat{f}_I^j$, when the $\Lambda_k^j$ is a maximum. The two sets are given as:

$$Y_k^j = \begin{cases} Z_k^j, & k \in \alpha_1 \\ D_k^j + Z_k^j, & k \in \alpha_2, \end{cases}$$

the $\alpha_1$ represents a location of the noise only tones ($Z_k^j$) and the $\alpha_2$ represents a location of the data plus noise tones ($D_k^j + Z_k^j$). The received sample is given as: $Y_k^j = H_{k'}^j * X_{k'}^j + Z_k^j$, and the $k' = k - \Delta f_I$. The $\Lambda_k^j$ is represented as:

$$\Lambda_k^j = \frac{\sum_{n \in \alpha_2} |Y_{n+k}^j|}{\sum_{n \in \alpha_1} |Y_{n+k}^j|}.$$

A received frequency domain sample, $Y_k^j$ may be obtained. The $Y_k^j$ is obtained as: $Y_k^j = H_k^j * X_k^j + Z_k^j$, the $Y_k^j$ represents the received frequency domain sample at the $k^{th}$ sub-carrier of the $53^{rd}$ OFDM data symbol in the $j^{th}$ time slot (TS). The $X_k^j$ represents the transmitted sample at the $k^{th}$ sub-carrier of the $53^{rd}$ OFDM data symbol in the $j^{th}$ time slot (TS). The $H_k^j$ represents a channel frequency response at the $k^{th}$ sub-carrier of the $53^{rd}$ OFDM data symbol in the $j^{th}$ time slot (TS). The $Z_k^j$ represents the additive white Gaussian noise (AWGN) at the $k^{th}$ sub-carrier of the $53^{rd}$ OFDM data symbol in the $j^{th}$ time slot (TS). The transmitted sample $X_k^j$ may be divided in a 111 samples length window based on a transmission location of the zeros tones. Spectral shift, $\Delta f_I$, is determined, based on an energy difference between the zero tones at $\alpha_1 + \Delta f_I$ and the non-zero tones at $\alpha_2 + \Delta f_I$. The integer coarse frequency offset estimate, $\Delta\hat{f}_I^j$, is given as:

$$\Delta\hat{f}_I^j = \underset{k \in I}{\operatorname{argmax}}(\Lambda_k^j).$$

The I represents a search range and is given by a maximum frequency offset, $[-\Delta f_{I,max}, \Delta f_{I,max}]$ and the integer coarse frequency offset estimate, $(\Delta\hat{f}_I^j)$, is given as:

$$\Delta\hat{f}_I^j = \underset{k \in I}{\operatorname{argmax}}\left(\sum_{p=j-q}^{j} \Lambda_k^p\right) \text{ to}$$

reduce false detection in the receiver.

In another aspect, a method of determining a coarse frequency offset of received symbols of a receiver in a CMMB mobile television network includes dividing each received symbol into 128 pairs, incrementing a counter corresponding to an index of a peak carrier within each pair, determining a sparseness index from a power of a peak sub-carrier and a power of an odd sub-carrier of the each pair, shifting each received symbol cyclically, and obtaining a coarse frequency offset using the sparseness index and the shifted symbol. The index with maximum counts may correspond as a candidate coarse frequency offset. The coarse frequency offset may result in a sparse channel estimate.

Each of the 128 pairs includes two sub-carriers. The first sample includes a location of a non-zero sub-carrier. The sparseness index includes a ratio of the power in the peak sub-carriers to the power in the odd sub-carrier of the pairs. The power of peak sub-carrier in each pair may be accumulated into a first peak power accumulator. The power of the odd sub-carrier of the pair may be accumulated into a second peak power accumulator. The candidate coarse frequency offset may lie within {+/−2*n, where n= . . . , −2, −1, 0, 1, 2 . . . } sub-carriers from the correct coarse frequency offset. The coarse frequency offset results in the sparse channel estimate when the signal-to-noise ratio (SNR) is lower than a predefined threshold.

In yet another aspect, a CMMB TV receiver to estimate a coarse frequency offset of received symbols based on a received frequency domain sample at a $k^{th}$ sub-carrier of a $53^{rd}$ OFDM data symbol in a $j^{th}$ time slot (TS) of the receiver includes a memory unit having a computer program set of instructions, a display unit operatively connected to the memory unit, and a processor adapted to execute the computer program set of instructions. The processor is adapted to divide a transmitted sample $X_k^j$ into two sets of noise only tones and data plus noise tones $D_k^j$. The two sets are given as:

$$X_k^j = \begin{cases} 0, & k \in \alpha_1 \\ D_k^j, & k \in \alpha_2. \end{cases}$$

The $\alpha_1$ represents a location of the zero tones (0) and the $\alpha_2$ represents a location of the non-zero tones $D_k^j$. The processor is also adapted to obtain a received sample only if there is a coarse frequency offset mismatch between a transmitter and the receiver. The received sample is given as: $Y_k^j=H_k^j*X_k^j+Z_k^j$ and the $k'=k-\Delta f_I$. The processor is further adapted to divide a summation of a power of the non-zero tones by a summation of a power of the zero-tones to obtain $\Lambda_k^j$. The $\Lambda_k^j$ is represented as:

$$\Lambda_k^j = \frac{\sum_{n\in\alpha_2} |Y_{n+k}^j|}{\sum_{n\in\alpha_1} |Y_{n+k}^j|}.$$

In addition, the processor is adapted to estimate an integer coarse frequency offset estimate $\Delta\hat{f}_I^j$ of the received symbols when the $\Lambda_k^j$ is a maximum.

The processor may be adapted to obtain a received frequency domain sample $Y_k^j$. The $Y_k^j$ is obtained as: $Y_k^j=H_k^j*X_k^j+Z_k^j$. The $Y_k^j$ may represent the received frequency domain sample at the $k^{th}$ sub-carrier of the $53^{rd}$ OFDM data symbol in the $j^{th}$ time slot (TS). The $X_k^j$ may represent the transmitted sample at the $k^{th}$ sub-carrier of the $53^{rd}$ OFDM data symbol in the $j^{th}$ time slot (TS). The $H_k^j$ may represent a channel frequency response at the $k^{th}$ sub-carrier of the $53^{rd}$ OFDM data symbol in the $j^{th}$ time slot (TS), and the $Z_k^j$ may represent the AWGN at the $k^{th}$ sub-carrier of the $53^{rd}$ OFDM data symbol in the $j^{th}$ time slot (TS). The transmitted sample $X_k^j$ may be divided in a 111 samples length window based on a transmission location of the zeros tones. The processor may further be adapted to determine spectral shift $\Delta f_I$ based on an energy difference between the zero tones at $\alpha_1+\Delta f_I$ and the non-zero tones at $\alpha_2+\Delta f_I$. The integer coarse frequency offset estimate $\Delta\hat{f}_I^j$ is given as:

$$\Delta\hat{f}_I^j = \underset{k\in I}{\operatorname{argmax}}(\Lambda_k^j).$$

The I may represent a search range and is given by a maximum frequency offset, $[-\Delta f_{I,max}, \Delta f_{I,max}]$. The integer coarse frequency offset estimate ($\Delta\hat{f}_I^j$) is given as:

$$\Delta\hat{f}_I^j = \underset{k\in I}{\operatorname{argmax}}\left(\sum_{p=j-q}^{j} \Lambda_k^p\right)$$

to reduce false detection in the receiver.

In yet another further aspect, a mobile TV receiver to estimate a coarse frequency offset in a CMMB mobile television network includes a memory unit to store a received frequency domain sample, a display unit operatively connected to the memory unit, and a processor adapted to divide each received symbol into 128 pairs, increment a counter corresponding to an index of a peak carrier within each pair, determine a sparseness index from a power of a peak sub-carrier and a power of an odd sub-carrier of the each pair, shift the each received symbol cyclically, and obtain a coarse frequency offset using the sparseness index and the shifted symbol. The index with maximum counts to correspond as a candidate coarse frequency offset. The coarse frequency offset to result in a sparse channel estimate.

Each of the 128 pairs includes two sub-carriers. A first sample includes a location of a non-zero sub-carrier. The sparseness index includes a ratio of the power in the peak sub-carriers to the power in the odd sub-carrier of the pairs. The power of the peak sub-carrier in each pair may be accumulated into a first peak power accumulator. The power of the odd sub-carrier of the pair may be accumulated into a second peak power accumulator. The candidate coarse frequency offset may lie within {+/−2*n, where n= . . . , −2, −1, 0, 1, 2 . . . } sub-carriers from the correct coarse frequency offset. The coarse frequency offset may result in the sparse channel estimate when the SNR is lower than a predefined threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
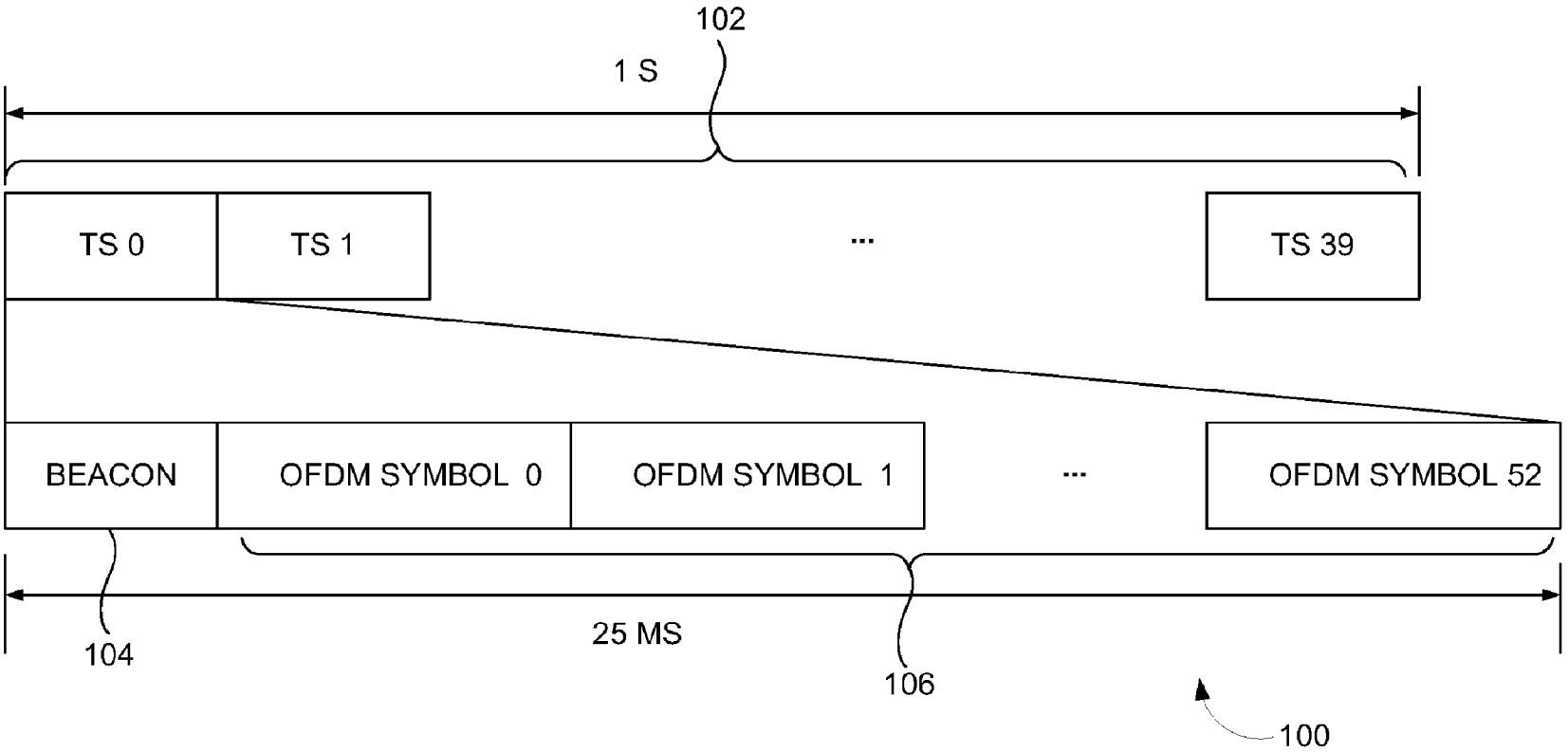
FIG. 1 is a physical layer frame structure defined in a mobile broadcasting system having time slots (TS), a beacon and OFDM data symbols according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of estimating coarse frequency offset of received symbols based on a received frequency domain sample. Referring now to the drawings and more particularly to FIGS. 1 through 8 where similar reference characters denote corresponding features consistently throughout the figures, there are shown preferred embodiments.

FIG. 1 is a physical layer frame structure 100 defined in a CMMB system, having time slots (TS) 102, a beacon symbol 104, and OFDM data symbols 106. In one frame of 1 s time duration, there are forty time slots (TS) 102 (e.g., TS0, TS1, TS2 up to TS39). Each time slot 102 is of 25 ms time duration and includes a beacon symbol 104 and fifty-three OFDM data symbols 106. The 53 OFDM data symbols 106 are OFDM symbol 0, OFDM symbol 1, and OFDM symbol 2 up to OFDM symbol 52, as shown. The OFDM data symbols 106 comprise continuous pilot (CP) tones, scattered pilot (SP) tones and data tones. Some data tones of the $53^{rd}$ OFDM symbol (i.e. OFDM symbol 52) transmit zeros instead of modulated information bits.

Figure 2:
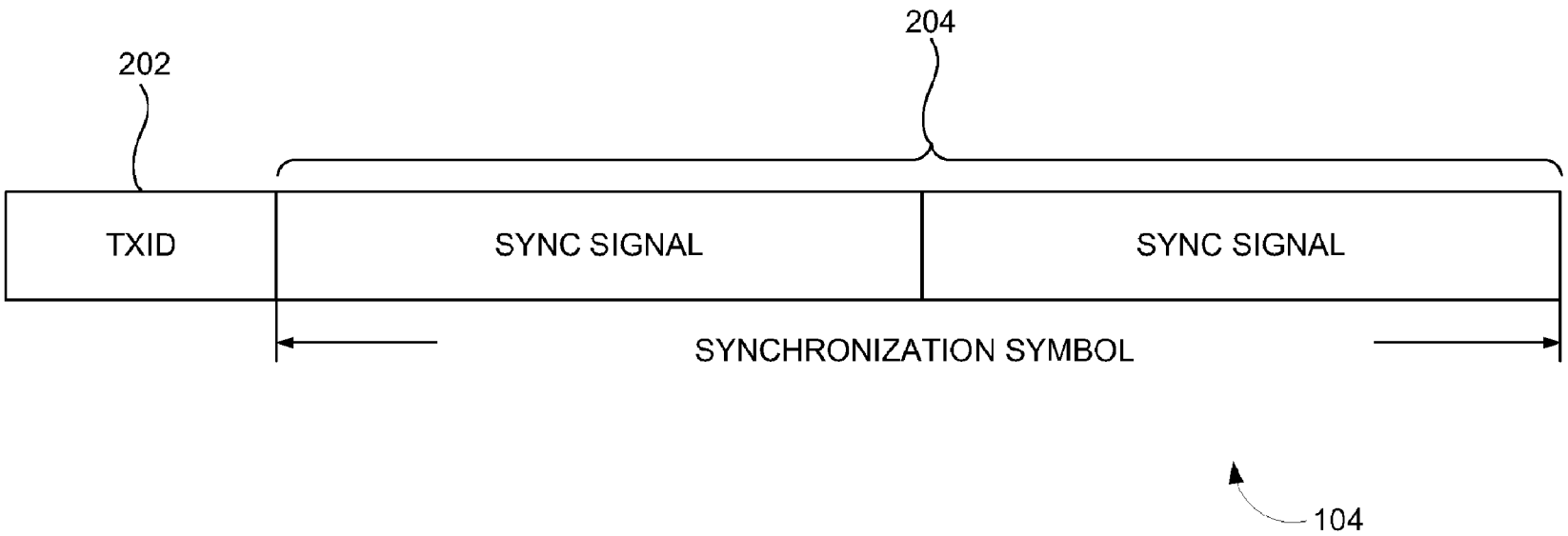
FIG. 2 is an exploded view of the beacon symbol of FIG. 1 having a transmitted ID (T×ID) and a synchronization symbol according to an embodiment herein.
Figure 3:
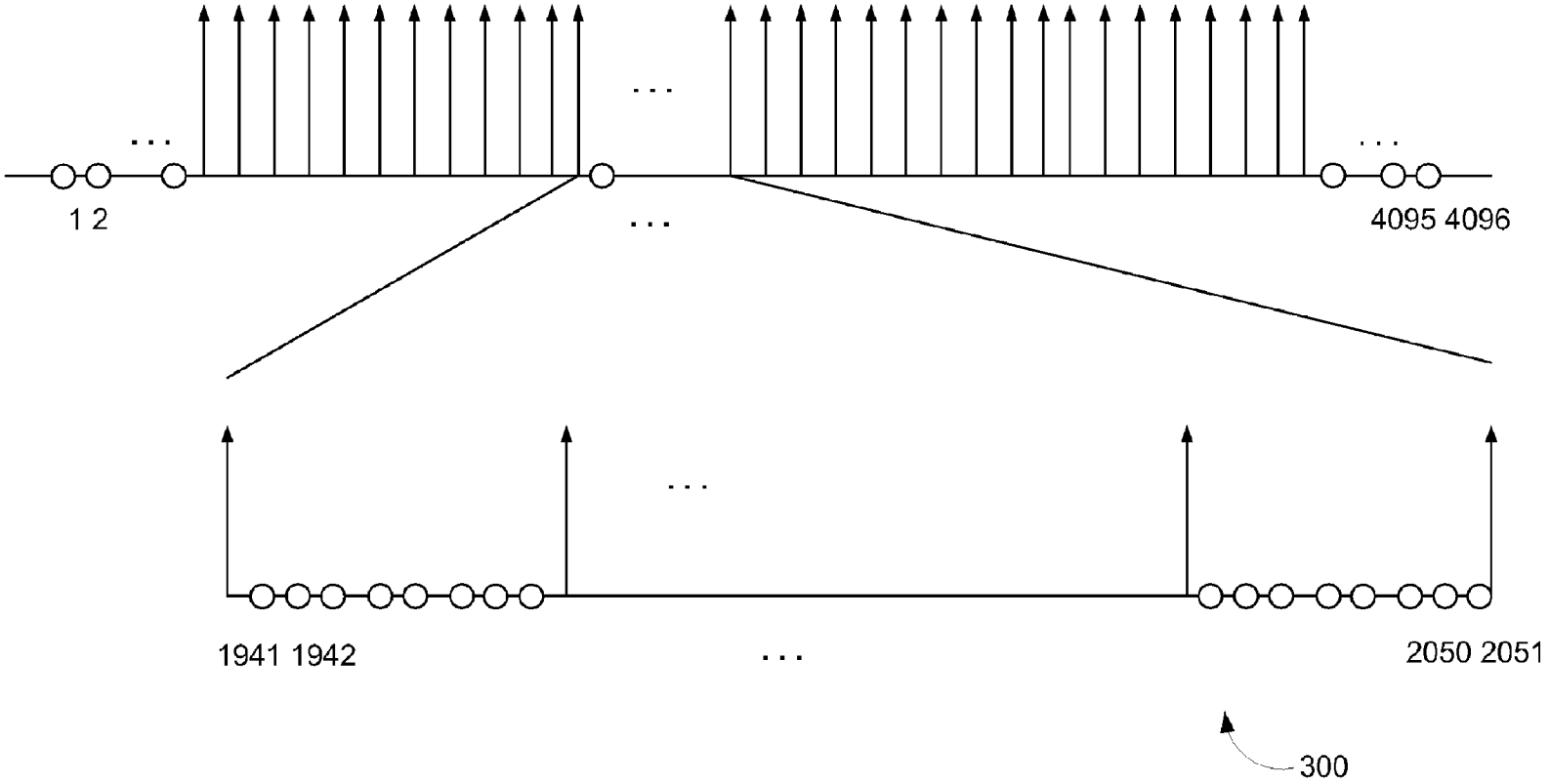
FIG. 3 is a frequency domain structure for the $53^{rd}$ OFDM symbol of FIG. 1 in each time slot (TS) having sub-carriers 1, 2, . . . , 1941, 1942, . . . 2050, 2051, . . . , 4095 and 4096 according to an embodiment herein.

FIG. 2 is an exploded view of the beacon symbol 104 of FIG. 1 having a transmitted ID (T×ID) 202 and a synchronization symbol 204. The synchronization symbol 204 includes two synchronization signals. FIG. 3 is a frequency domain structure 300 for $53^{rd}$ OFDM symbol of FIG. 1 in each time slot (TS) 102 having sub-carriers 1, 2 . . . 1941, 1942 . . . 2050, 2051 . . . 4095 and 4096. There are 90 zero tones and 21 non-zero tones transmitted between the $1941^{st}$ sub-carrier and the $2051^{st}$ sub-carrier, as defined in the CMMB standard.

Figure 4:
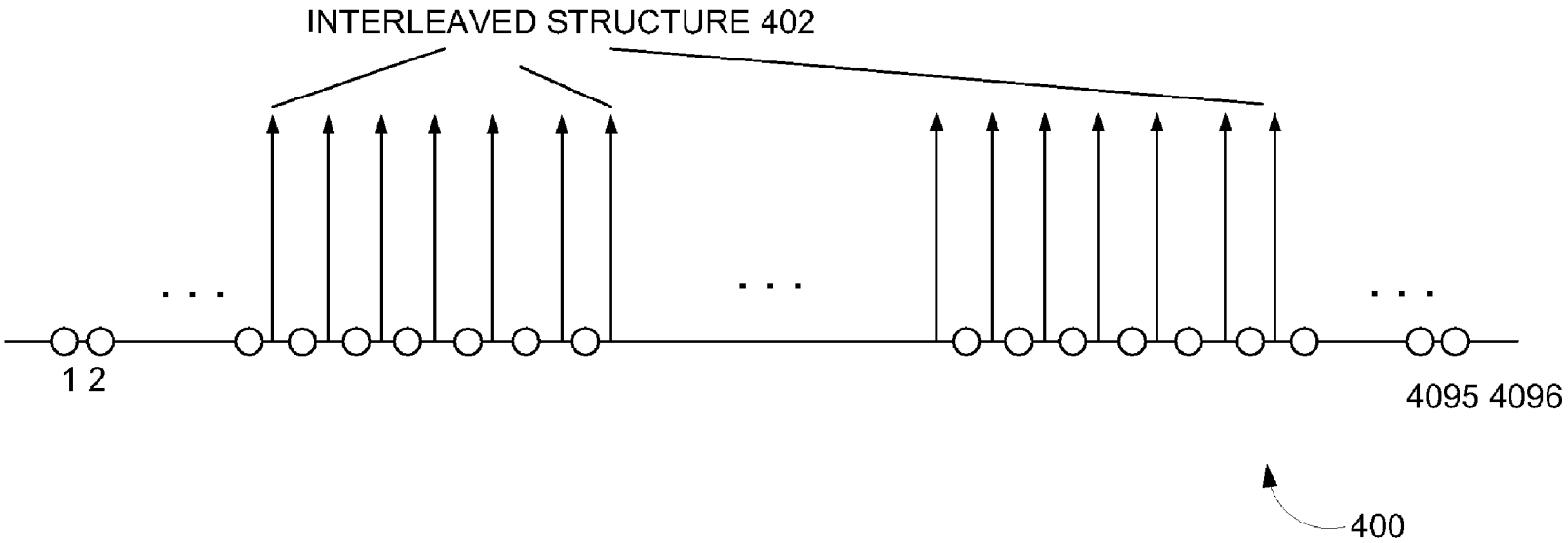
FIG. 4 is a frequency domain structure of the synchronization symbol of FIG. 2 having sub-carriers ranging from 1, 2, 3, up to 4096 according to an embodiment herein.

FIG. 4 is a frequency domain structure 400 of the synchronization symbol 204 of FIG. 2 having sub-carriers ranging from 1, 2, 3, up to 4096. The frequency domain pilots of the synchronization symbol 204 are located in an interleaved structure 402. The synchronization symbol 204 has two identical parts in the time domain. During the process of transmission, any mismatch found between transmitter and receiver oscillators causes a deviation called carrier frequency offset Δf. The carrier frequency offset Δf is calculated using the expression: $\Delta f=\Delta f_I*\Delta f_c+\Delta f_f$. In OFDM receiver design, $\Delta f_f$ is estimated and corrected in the time domain first. The basic idea is to find $\Delta f_c$, which is the sub-carrier frequency separation. $\Delta f_f$, the fractional part of $\Delta f_c$ (referred to as fine frequency offset) is obtained from the calculated $\Delta f_c$ values. $\Delta f_I$ is the integer times of $\Delta f_c$ (referred to as coarse frequency offset) and is estimated and corrected in the frequency domain.

The carrier frequency offset Δf can be estimated from the obtained values of $\Delta f_I$, $\Delta f_c$, and $\Delta_f$. The traditional coarse frequency offset estimator used for estimating the coarse frequency offset Δf in wireless OFDM system utilizes identical continuous pilot (CP) tones in two continuous OFDM symbols. However, in CMMB, the continuous pilot (CP) tones in two continuous OFDM symbols may not be identical due to the fact that the symbols are scrambled by random noise before transmission.

Figure 5:
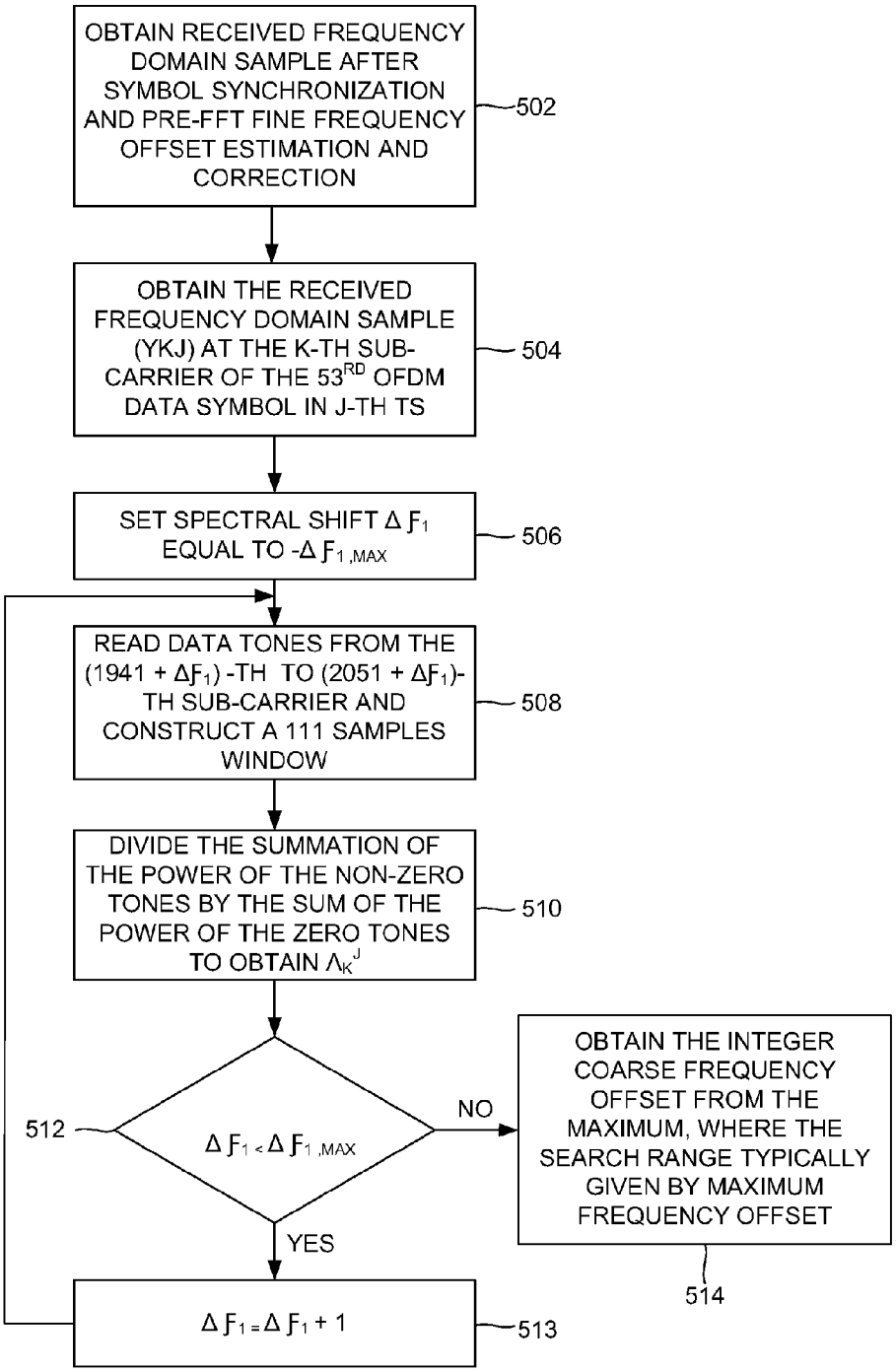
FIG. 5 is a flow diagram illustrating a method of estimating coarse frequency offset by a tail bits approach according to an embodiment herein.

FIG. 5 is a flow diagram illustrating a method of estimating coarse frequency offset by a tail bits approach, according to an embodiment herein. In step 502, a received frequency domain sample is obtained after symbol synchronization and a pre-FFT fine frequency offset estimation and correction process. The symbol synchronization and fine frequency offset estimation are performed by exploiting the correlation of the two identical synchronization signal 204 of FIG. 2. In step 504, the received frequency domain sample at a $k^{th}$ sub-carrier of $53^{rd}$ OFDM data symbol in a $j^{th}$ TS is obtained as: $Y_k^j=H_k^j*X_k^j+Z_k^j$, where, $Y_k^j$ represents the received frequency domain sample at the $k^{th}$ sub-carrier of the $53^{rd}$ OFDM data symbol in the $j^{th}$ time slot (TS), $X_k^j$ represents the transmitted sample at the $k^{th}$ sub-carrier of the $53^{rd}$ OFDM data symbol in the $j^{th}$ time slot (TS), $H_k^j$ represents the channel frequency response at the $k^{th}$ sub-carrier of the $53^{rd}$ OFDM data symbol in the $j^{th}$ time slot (TS), and $Z_k^j$ represents an AWGN at the $k^{th}$ sub-carrier of the $53^{rd}$ OFDM data symbol in the $j^{th}$ time slot (TS). The channel frequency response is obtained by applying a Fast Fourier Transform (FFT) to the time domain channel.

In step 506, the initial spectral shift is set to equal $-\Delta f_{I,max}$. The spectral shift is a possible coarse frequency offset or can be treated as a coarse frequency offset candidate. In step 508, a 111 samples window is constructed. The window is preferably embodied as a data vector which includes the data tones read from the $(1941+\Delta f_I)$-th sub-carrier and the $(2051+\Delta f_I)$-th sub-carrier. In step 510, the 111 samples are first divided into two sets of noise only tones ($Z_k^j$) and data plus noise tones ($D_k^j+Z_k^j$) and is given as:

$$Y_k^j=\begin{cases} Z_k^j, & k\in\alpha_1 \\ D_k^j+Z_k^j, & k\in\alpha_2 \end{cases}$$

where $\alpha_1$ and $\alpha_2$ represent the location of the noise only ($Z_k^j$) and the data plus noise ($D_k^j+Z_k^j$), respectively. The value of $\Lambda_k^j$ is obtained by dividing the summation of the power of the data plus noise tones ($D_k^j$) by the summation of the power of the data plus noise tones ($D_k^j+Z_k^j$) and is given as:

$$\Lambda_k^j=\frac{\sum_{n\in\alpha_2}|Y_{n+k}^j|}{\sum_{n\in\alpha_1}|Y_{n+k}^j|}.$$

where n represents an integer value.

In step 512, a condition is checked whether the spectral shift $\Delta f_I$ is equal to the positive maximum frequency offset. The process proceeds to step 508 (through step 513) if the frequency offset search range $[-\Delta f_{I,max}, \Delta f_{I,max}]$ is not achieved (Yes) and the process proceeds to step 514 if the condition is achieved (No). In step 514, the integer coarse frequency offset estimate $\Delta\hat{f}_I^j$ is obtained from the maximum of $\Lambda_k^j$ and is given as:

$$\Delta\hat{f}_I^j = \underset{k\in I}{\operatorname{argmax}}(\Lambda_k^j).$$

In a preferred embodiment, I represent a search range and is given by the maximum frequency offset $[-\Delta f_{I,max}, \Delta f_{I,max}]$. In another embodiment, for SNR's of 3 dB and above, the probability of false detection is very small and the performance can be improved by approximately 1-2 dB by averaging q symbols first and is given as:

$$\Delta\hat{f}_I^j = \underset{k\in I}{\operatorname{argmax}}\left(\sum_{p=j-q}^{j} \Lambda_k^p\right),$$

where $\Delta\hat{f}_I^j$ represents the integer coarse frequency offset estimate.

Figure 6A:
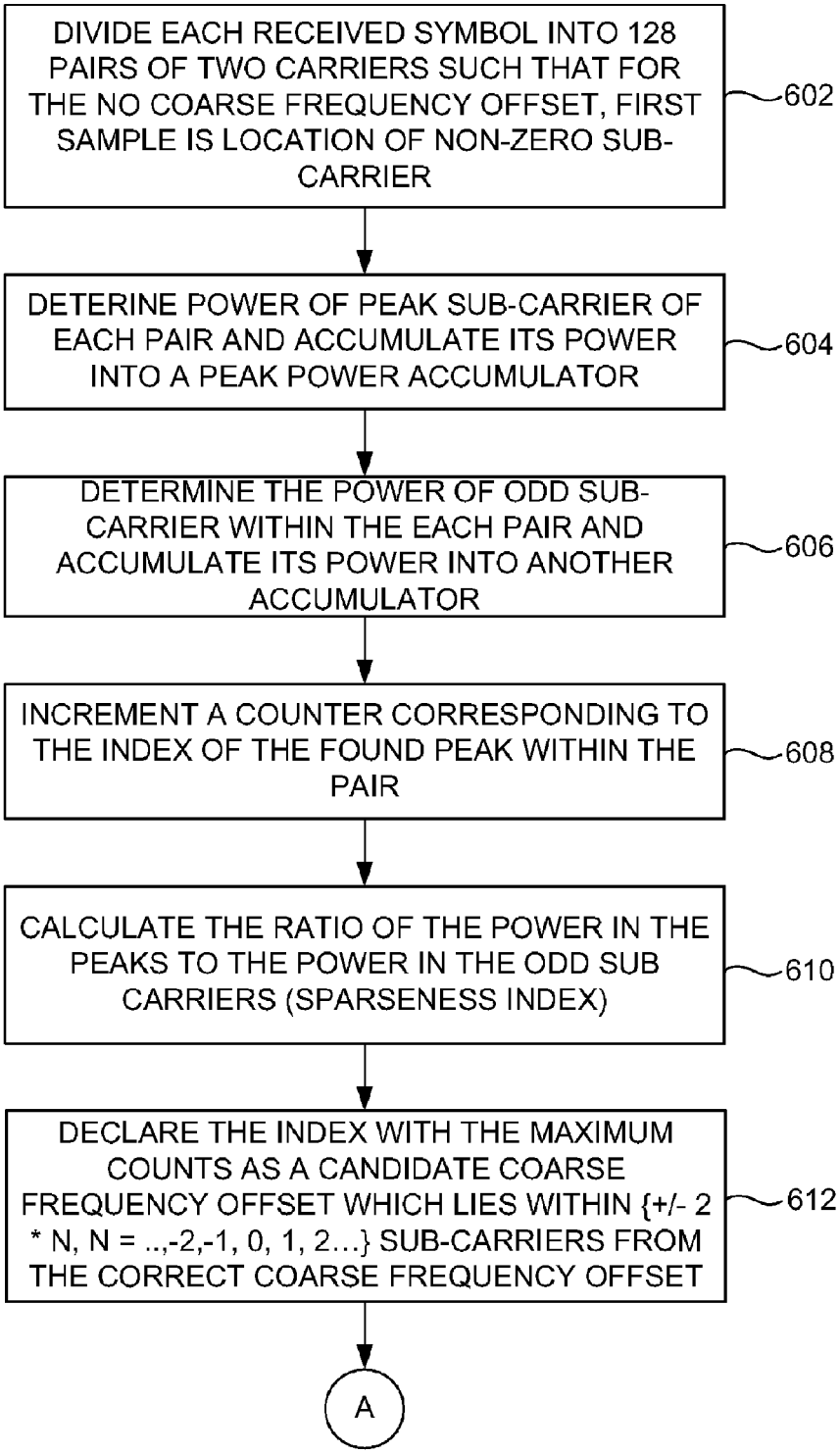
FIGS. 6A and 6B are flow diagrams illustrating a method of estimating coarse frequency offset by a synchronization signal approach according to an embodiment herein.
Figure 6B:
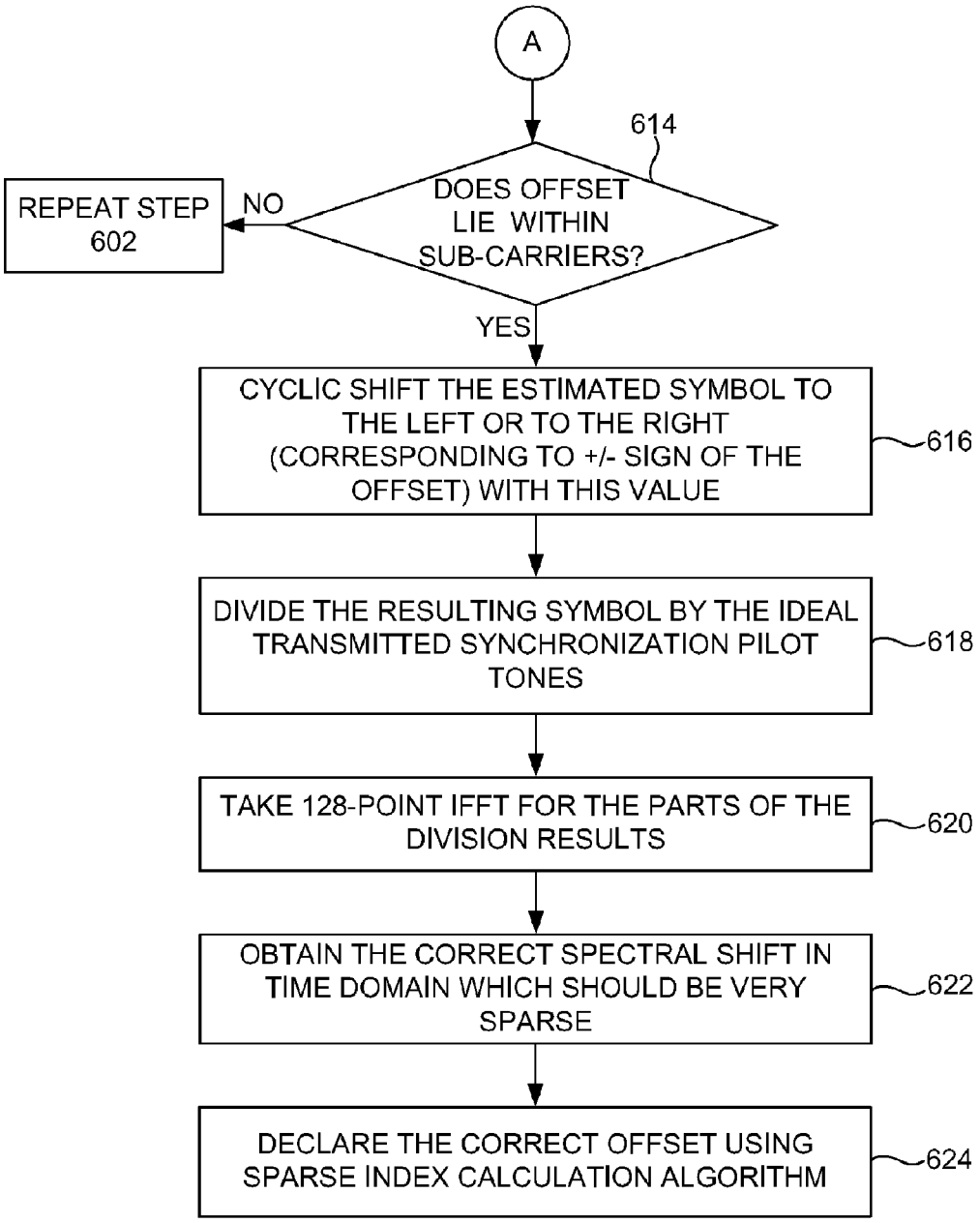

FIGS. 6A and 6B are flow diagrams illustrating a method of estimating coarse frequency offset by a synchronization signal approach, according to an embodiment herein. In step 602, each of the received symbols is divided into 128 pairs of two carriers such that for the non-coarse frequency offset, the first sample is the location of non-zero sub-carrier. In step 604, a power of peak sub-carrier of the pair is determined and its power is accumulated into a peak power accumulator (not shown). Each pair has two sub-carriers. In one step, the first sub-carrier is treated as the "peak sub-carrier" and the second sub-carrier is treated as "rest sub-carrier".

The power of "peak sub-carrier" and the power of "rest sub-carrier" from each pair are accumulated. The power ratio between these two accumulators corresponds to the index of the "peak sub-carrier" which is 1 in this case. In an alternative step, the second sub-carrier is treated as the "peak sub-carrier" and the first sub-carrier is treated as the "rest sub-carrier" and the power accumulation is repeated. Finally, two power ratios are generated, which correspond to the index of the sub-carrier. The index with a maximum power ratio is declared as a candidate coarse frequency offset. In step 606, the power of the rest sub-carrier within the each pair is determined and accumulated into another accumulator (not shown). In step 608, a counter (not shown) is incremented corresponding to the index of the found peak within the pair.

In step 610, the ratio of the power in the peaks to the power in the rest sub-carriers (sparseness index) is calculated. In step 612, the index with maximum counts is declared as a candidate coarse frequency offset which lies within {+/−2*n, n=. . . , −2, −1, 0, 1, 2 . . . } sub-carriers from the correct coarse frequency offset. In step 614, the offset is checked; if it lies within sub-carriers (Yes), then step 616 is performed, else (No) the step 602 is repeated. In step 616, the estimated symbol is cyclic shifted either to the left or to the right (corresponding to +/− sign of the offset) with this value for each possible offset within this set. In step 618, the resulting cyclic shifted symbol is divided by the ideal transmitted synchronization pilot tones which results in an estimate of the channel in the frequency domain for the correct shift. In steps 620 and 622, a 128-point Inverse Fast Fourier Transform (IFFT) is taken for the parts of the division results and the channel in the time domain is obtained, which is very sparse for the correct spectral shift. In step 624, a sparseness index calculation algorithm is used and the offset which results in the most sparse channel estimate is declared as the correct one.

Figure 7:
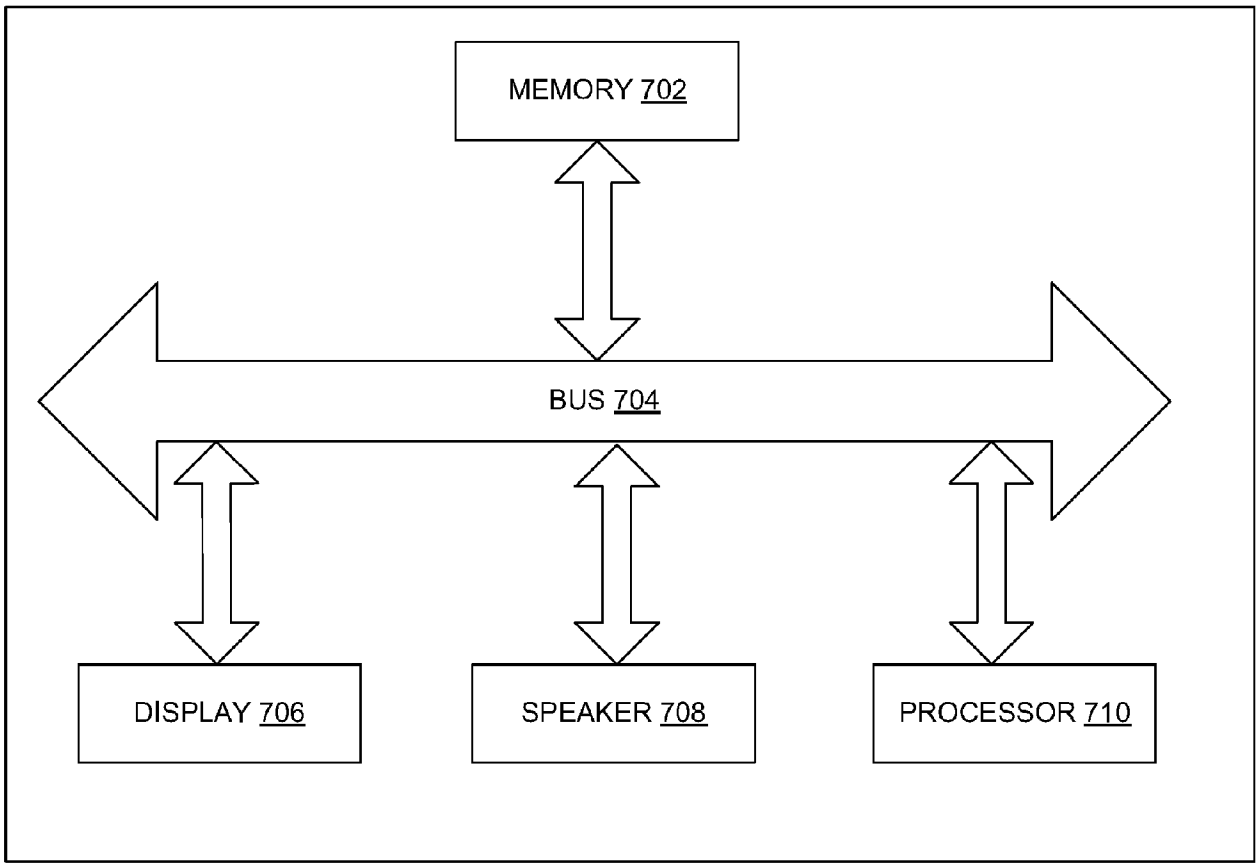
FIG. 7 illustrates an exploded view of a mobile TV receiver according to an embodiment herein.

FIG. 7 illustrates an exploded view of a mobile TV receiver 700 having a memory 702 with a computer set of instructions, a bus 704, a display 706, a speaker 708, and a processor 710 capable of processing the set of instructions to perform any one or more of the methodologies herein, according to an embodiment herein. The processor 710 may also enable frequency samples to be consumed in the form of one or more displays 706 or audio for output via speaker and/or earphones 708. The processor 710 may also carry out the methods described herein and in accordance with the embodiments herein. The received frequency domain sample may also be stored in the memory 702 for future processing or consumption. The memory 702 may also store specific information about the frequency domain sample available in the future or stored from the past. When the sample is selected, the processor 710 may pass information. The information may be passed among functions within mobile TV receiver 700 using the bus 704.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
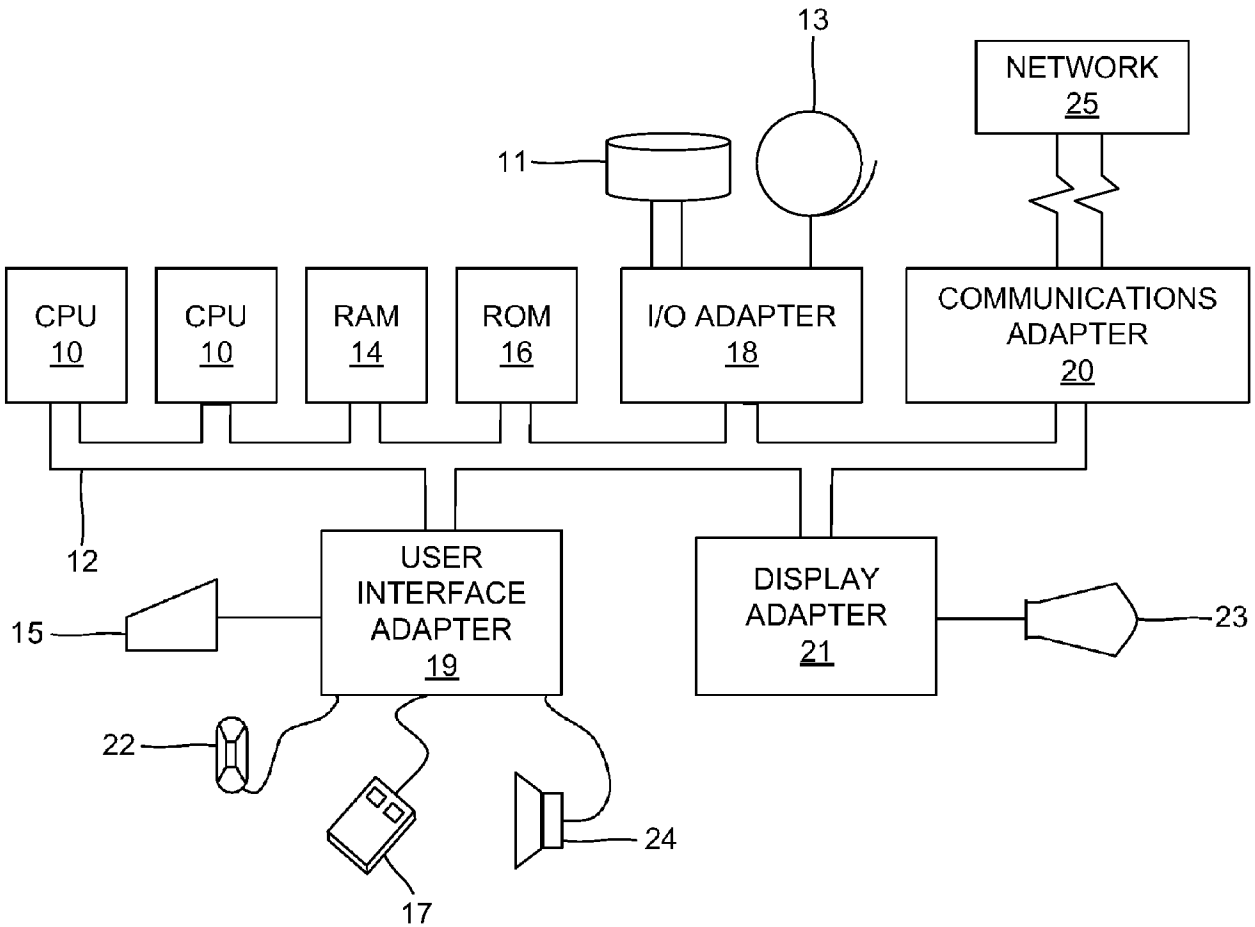
FIG. 8 illustrates a schematic diagram of a computer architecture according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein provide a synchronization symbol approach, which has a better performance at a low SNR condition. In addition, the tail bits approach has a lower computation complexity. The TV receiver circuit when compared with other traditional designed mobile TV standards has two special spectral structures defined in CMMB. The frequency domain pilots of the synchronization symbol 204 are located in the interleaved structure 402 since the synchronization symbol 204 has two identical parts at the time domain (e.g., two synchronous signals).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of estimating coarse frequency offset of received symbols based on a received frequency domain sample at a $k^{th}$ sub-carrier of a $53^{rd}$ Orthogonal Frequency Division Multiplexing (OFDM) data symbol in a $j^{th}$ time slot (TS) of a receiver in a [China Multimedia Mobile Broadcasting (CMMB) mobile television] *communication* network, said method comprising:

dividing a received sample, $Y_k^j$, into two sets of noise only tones and data plus noise tones $D_k^j$, wherein said two sets is given as:

$$Y_k^j = \begin{cases} Z_k^j, & k \in \alpha_1 \\ D_k^j + Z_k^j, & k \in \alpha_2, \end{cases}$$

wherein said $\alpha_1$ represents a location of said noise only tones ($Z_k^j$) and said $\alpha_2$ represents a location of said data plus noise tones ($D_k^j+Z_k^j$);

obtaining a received sample only if there is a coarse frequency offset mismatch between a transmitter and said receiver, wherein said received sample is given as: $Y_k^j=H_{k'}^j*X_{k'}^j+Z_k^j$, wherein $k'=k-\Delta f_I$;

dividing a summation of a power of said data plus noise tones by a summation of a power of said noise only tones to obtain $\Lambda_k^j$, wherein said $\Lambda_k^j$ is represented as:

$$\Lambda_k^j = \frac{\sum_{n\in\alpha_2} |Y_{n+k}^j|}{\sum_{n\in\alpha_1} |Y_{n+k}^j|};$$

and estimating an integer coarse frequency offset estimate, $\Delta\hat{f}_I^j$, of said received symbols based on a maximum value of said $\Lambda_k^j$, wherein said integer coarse frequency offset estimate, $\Delta\hat{f}_I^j$, is given as:

$$\Delta\hat{f}_I^j = \underset{k\in I}{\operatorname{argmax}}(\Lambda_k^j),$$

wherein I represents a search range and is given by a maximum frequency offset, $[-\Delta f_{I,max}, \Delta f_{I,max}]$.

2. The method of claim 1, further comprising obtaining a received frequency domain sample, $Y_k^j$, wherein said $Y_k^j$ is obtained as: $Y_k^j=H_k^j*X_k^j+Z_k^j$, wherein $Y_k^j$ represents said received frequency domain sample at said $k^{th}$ sub-carrier of said $53^{rd}$ OFDM data symbol in said $j^{th}$ time slot (TS), wherein $X_k^j$ represents said transmitted sample at said $k^{th}$ sub-carrier of said $53^{rd}$ OFDM data symbol in said $j^{th}$ time slot (TS), wherein $H_k^j$ represents a channel frequency response at said $k^{th}$ sub-carrier of said $53^{rd}$ OFDM data symbol in said $j^{th}$ time slot (TS), and wherein $Z_k^j$ represents an additive white Gaussian noise (AWGN) at said $k^{th}$ sub-carrier of said $53^{rd}$ OFDM data symbol in said $j^{th}$ time slot (TS).

3. The method of claim 1, wherein said transmitted sample $X_k^j$ is divided in a 111 samples length window based on a transmission location of said zeros tones.

4. The method of claim 1, further comprising determining a spectral shift, $\Delta f_I$, based on an energy difference between said zero tones at $\alpha_1+\Delta f_I$ and said non-zero tones at $\alpha_2+\Delta f_I$.

5. The method of claim 1, wherein said integer coarse frequency offset estimate, $(\Delta\hat{f}_I^j)$, is given as:

$$\Delta\hat{f}_I^j = \underset{k\in I}{\operatorname{argmax}}\left(\sum_{p=j-q}^{j} \Lambda_k^p\right)$$

to reduce false detection in said receiver.

6. A method of determining a coarse frequency offset of received symbols of a receiver in a [China Multimedia Mobile Broadcasting (CMMB) mobile television] *communication* network, said method comprising:

using a memory unit operatively connected to said receiver to store a computer program set of instructions;

using a processor for executing said program set of instructions, wherein said program set of instructions comprise:

dividing each received symbol into 128 pairs;

incrementing a counter corresponding to an index of a peak carrier within each pair;

determining a sparseness index from a power of a peak sub-carrier and a power of an odd sub-carrier of said each pair, wherein said index with maximum counts corresponds as a candidate coarse frequency offset;

shifting said each received symbol cyclically; and obtaining a coarse frequency offset in said [CMMB mobile television] *communication* network using said sparseness index and the shifted symbol, wherein said coarse frequency offset results in a sparse channel estimate.

7. The method of claim 6, wherein each of said 128 pairs comprise two sub-carriers, wherein a first sample comprises a location of a non-zero sub-carrier.

8. The method of claim 6, wherein said sparseness index comprises a ratio of said power in said peak sub-carriers to said power in said odd sub-carrier of said pairs.

9. The method of claim 6, wherein said power of peak sub-carrier in each said pair is accumulated into a first peak power accumulator, and wherein said power of said odd sub-carrier of said pair is accumulated into a second peak power accumulator.

10. The method of claim 6, wherein said candidate coarse frequency offset lies within {+/−2*n, where n=. . . , −2, −1, 0, 1, 2 . . . } sub-carriers from said correct coarse frequency offset.

11. The method of claim 6, wherein said coarse frequency offset results in said sparse channel estimate when said signal-to-noise ratio (SNR) is lower than a predefined threshold.

12. A [China Multimedia Mobile Broadcasting (CMMB) television (TV)] receiver to estimate a coarse frequency offset of received symbols based on a received frequency domain sample at a $k^{th}$ sub-carrier of a $53^{rd}$ Orthogonal Frequency Division Multiplexing (OFDM) data symbol in a $j^{th}$ time slot (TS) of the receiver, wherein said [CMMB TV] receiver comprises:

a memory unit comprising a computer program set of instructions;

a display unit operatively connected to said memory unit; and a processor adapted to execute said computer program set of instructions, wherein said processor is adapted to:

divide a transmitted sample, $X_k^j$, into two sets of noise only tones and data plus noise tones $D_k^j$, wherein said two sets is given as:

$$X_k^j = \begin{cases} 0, & k \in \alpha_1 \\ D_k^j, & k \in \alpha_2, \end{cases}$$

wherein said $\alpha_1$ represents a location of said zero tones (0) and said $\alpha_2$ represents a location of said non-zero tones ($D_k^j$);

obtain a received sample only if there is a coarse frequency offset mismatch between a transmitter and said receiver, wherein said received sample is given as: $Y_k^j=H_{k'}^j*X_k^j+Z_k^j$, wherein $k'=k-\Delta f_I$;

divide a summation of a power of said non-zero tones by a summation of a power of said zero-tones to obtain $\Lambda_k^j$, wherein said $\Lambda_k^j$ is represented as:

$$\Lambda_k^j = \frac{\sum_{n\in\alpha_2} |Y_{n+k}^j|}{\sum_{n\in\alpha_1} |Y_{n+k}^j|};$$

estimate an integer coarse frequency offset estimate, $\Delta\hat{f}_I^j$, of said received symbols when said $\Lambda_k^j$ is a maximum.

13. The [CMMB TV] receiver of claim 12, wherein said processor is adapted to obtain a received frequency domain sample, $Y_k^j$, wherein said $Y_k^j$ is obtained as: $Y_k^j=H_k^j*X_k^j+Z_k^j$, wherein $Y_k^j$ represents said received frequency domain sample at said $k^{th}$ sub-carrier of said $53^{rd}$ OFDM data symbol in said $j^{th}$ time slot (TS), wherein $X_k^j$ represents said transmitted sample at said $k^{th}$ sub-carrier of said $53^{rd}$ OFDM data symbol in said $j^{th}$ time slot (TS), wherein $H_k^j$ represents a channel frequency response at said $k^{th}$ sub-carrier of said $53^{rd}$ OFDM data symbol in said $j^{th}$ time slot (TS), and wherein $Z_k^j$ represents an additive white Gaussian noise (AWGN) at said $k^{th}$ sub-carrier of said $53^{rd}$ OFDM data symbol in said $j^{th}$ time slot (TS).

14. The [CMMB TV] receiver of claim 12, wherein said transmitted sample $X_k^j$ is divided in a 111 samples length window based on a transmission location of said zeros tones.

15. The [CMMB TV] receiver of claim 12, wherein said processor is adapted to determine spectral shift, $\Delta f_I$, based on an energy difference between said zero tones at $\alpha_1+\Delta f_I$ and said non-zero tones at $\alpha_2+\Delta f_I$.

16. The [CMMB TV] receiver of claim 12, wherein said integer coarse frequency offset estimate, $\Delta\hat{f}_I^j$, is given as:

$$\Delta\hat{f}_I^j = \underset{k\in I}{\operatorname{argmax}}(\Lambda_k^j),$$

wherein I represents a search range and is given by a maximum frequency offset, $[\Delta f_{I,max}, \Delta f_{I,max}]$, and said integer coarse frequency offset estimate, $(\Delta \hat{f}_I^j)$, is given as:

$$\Delta \hat{f}_I^j = \underset{k \in I}{\operatorname{argmax}} \left( \sum_{p=j-q}^{j} \Lambda_k^p \right)$$

to reduce false detection in said receiver.

17. A [mobile television (TV)] receiver to estimate a coarse frequency offset in a [China Multimedia Mobile Broadcasting (CMMB) mobile television] *communication* network, said [mobile TV] receiver comprising:

a memory unit to store a received frequency domain sample;

a display unit operatively connected to said memory unit; and a processor adapted to:

divide each received symbol into 128 pairs;

increment a counter corresponding to an index of a peak carrier within each pair;

determine a sparseness index from a power of a peak sub-carrier and a power of an odd sub-carrier of said each pair, wherein said index with maximum counts corresponds as a candidate coarse frequency offset;

shift said each received symbol cyclically; and obtain a coarse frequency offset in said [CMMB mobile television] *communication* network using said sparseness index and the shifted symbol, wherein said coarse frequency offset results in a sparse channel estimate.

18. The [mobile TV] receiver of claim 17, wherein each of said 128 pairs comprise two sub-carriers, wherein a first sample comprises a location of a non-zero sub-carrier.

19. The [mobile TV] receiver of claim 17, wherein said sparseness index comprises a ratio of said power in said peak sub-carriers to said power in said odd sub-carrier of said pairs.

20. The [mobile TV] receiver of claim 17, wherein said power of peak sub-carrier in each said pair is accumulated into a first peak power accumulator, and wherein said power of said odd sub-carrier of said pair is accumulated into a second peak power accumulator.

21. The [mobile TV] receiver of claim 17, wherein said candidate coarse frequency offset lies within {+/−2*n, where n= . . . , −2, −1, 0, 1, 2 . . . } sub-carriers from said correct coarse frequency offset.

22. The [mobile TV] receiver of claim 17, wherein said coarse frequency offset results in said sparse channel estimate when said signal-to-noise ratio (SNR) is lower than a predefined threshold.

* * * * *